United States Patent [19]

Stroud et al.

[11] 4,267,135

[45] May 12, 1981

[54] PROCESS AND APPARATUS FOR THE CONTINUOUS MOLDING OF POLYMER FOAM BUNSTOCK HAVING A SUBSTANTIALLY RECTANGULAR CROSS-SECTION

[75] Inventors: Richard M. Stroud, Houston, Tex.; Richard A. Kolakowski, Northford, Conn.

[73] Assignee: The Upjohn Company, Kalamazoo, Mich.

[21] Appl. No.: 113,678

[22] Filed: Jan. 21, 1980

[51] Int. Cl.³ .............................................. B29D 27/04
[52] U.S. Cl. ...................................... 264/51; 264/216; 264/DIG. 84; 425/89; 425/224; 425/817 C
[58] Field of Search ................... 264/51, 53, DIG. 84, 264/216; 425/89, 224, 817 C

[56] References Cited

U.S. PATENT DOCUMENTS

| | | | |
|---|---|---|---|
| 3,354,503 | 11/1967 | Joseph et al. | 264/DIG. 84 |
| 3,986,991 | 10/1976 | Kolakowski et al. | 264/53 X |
| 4,097,210 | 6/1978 | Romanillos | 264/DIG. 84 |
| 4,128,611 | 12/1978 | Kolakowski et al. | 264/51 |

FOREIGN PATENT DOCUMENTS 1476177 6/1977 United Kingdom .

Primary Examiner—Philip Anderson
Attorney, Agent, or Firm—Denis A. Firth; John Kekich

[57] ABSTRACT

An improvement is described in a prior art process and apparatus for the preparation of continuous polymer bunstock having substantially rectangular cross-section which employs a panel member having its downstream end pivotally mounted above a conventional moving trough-shaped mold, the underside of said panel member floating freely in tangential contact with the rising foam in the area immediately following the gel point of said foam but before the point at which the foam is no longer sufficiently mobile to be molded without distortion of the cells thereof. The improvement, which is particularly designed for use in those cases (e.g. polyisocyanurate foam forming mixtures) in which the rise profile characteristics of the foam render it difficult to achieve the desired effect (rectangular cross-section) using the panel member alone, comprises providing a short extension pivotally mounted on the upstream end of said panel member, which extension is caused to contact the rising foam at a point immediately prior to gel.

5 Claims, 6 Drawing Figures

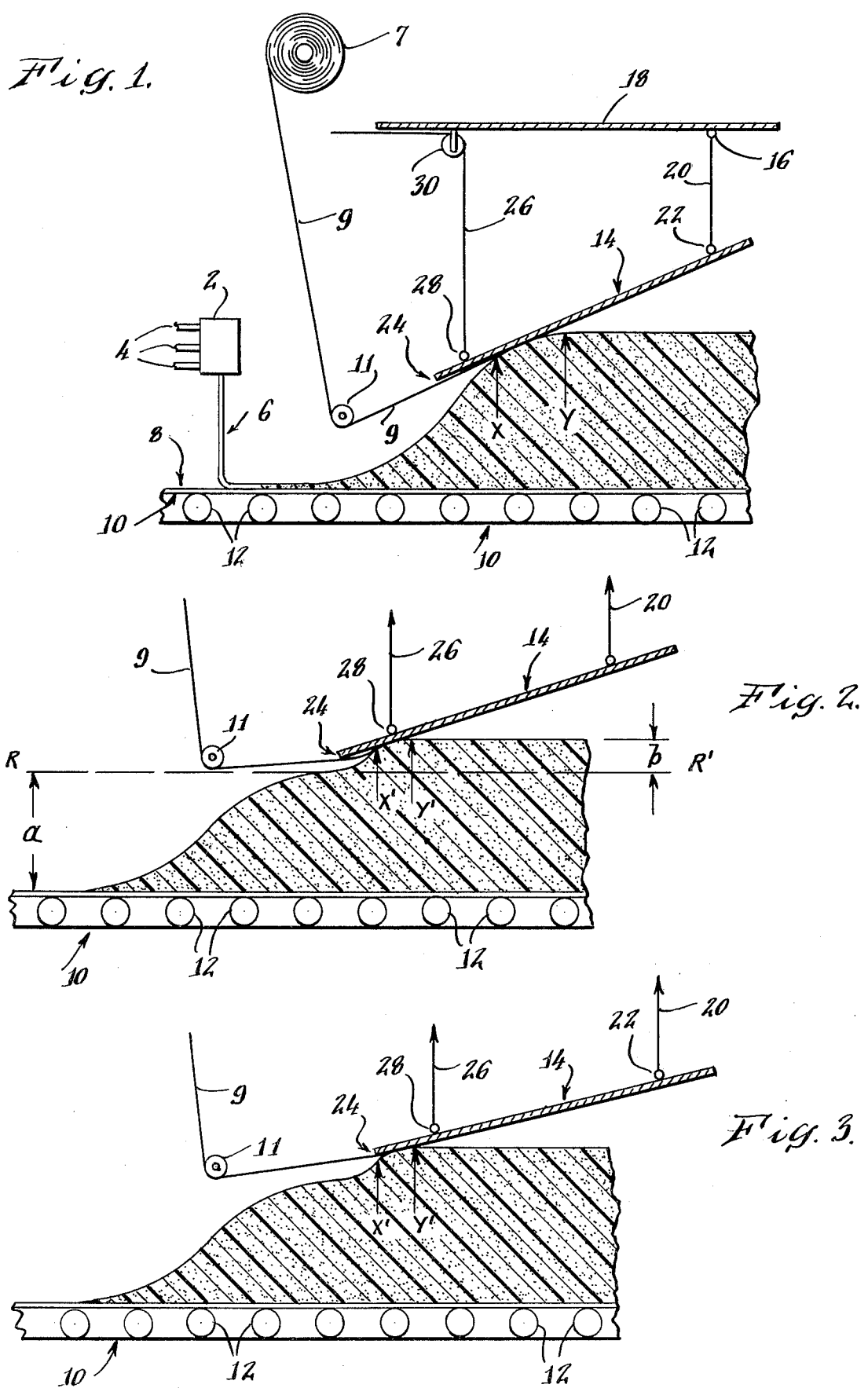

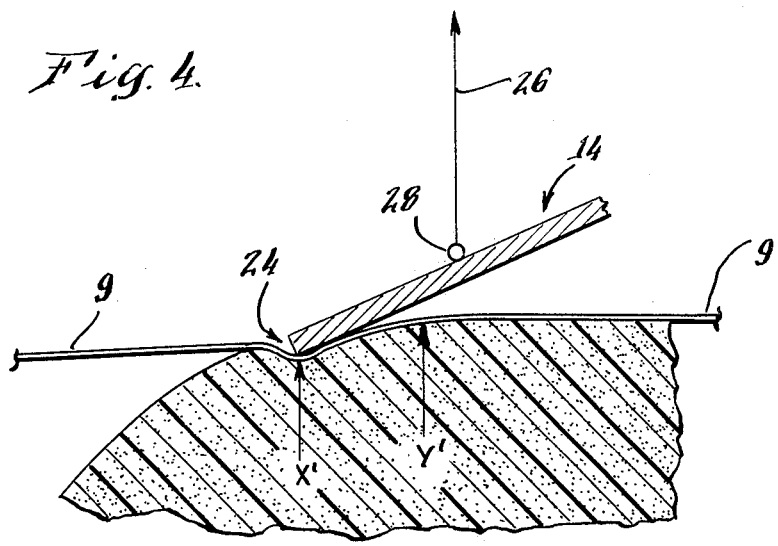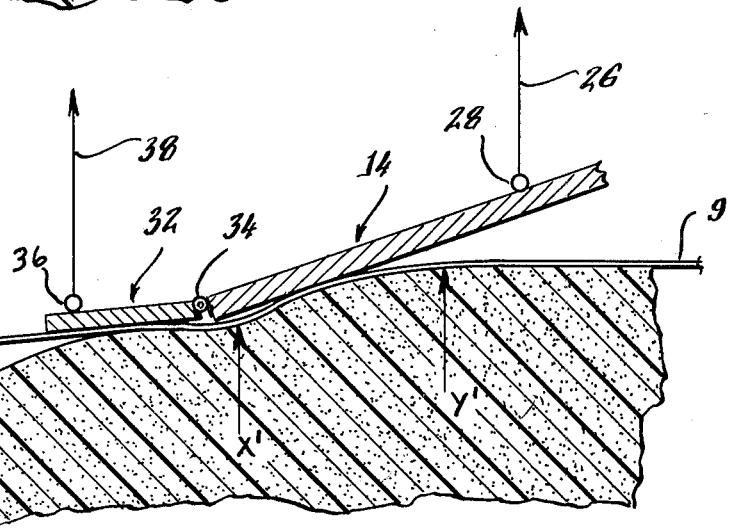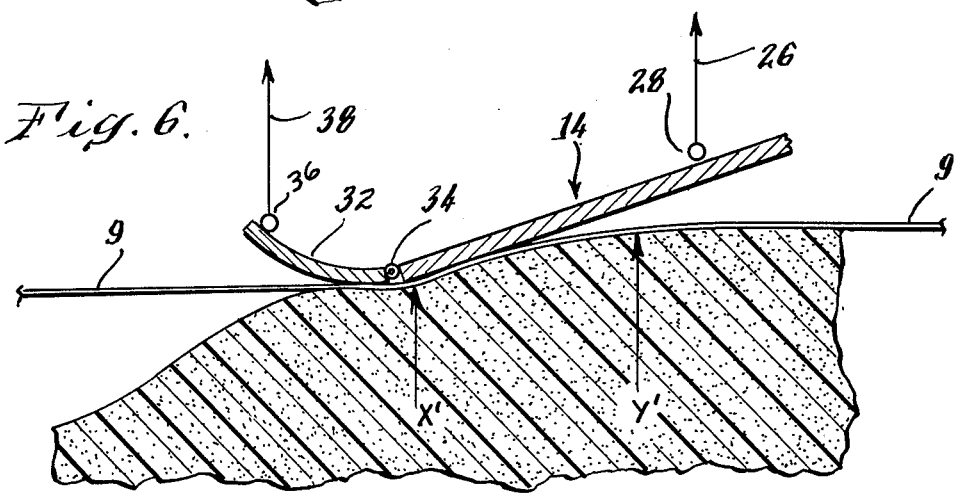

PROCESS AND APPARATUS FOR THE CONTINUOUS MOLDING OF POLYMER FOAM BUNSTOCK HAVING A SUBSTANTIALLY RECTANGULAR CROSS-SECTION

BACKGROUND OF THE INVENTION

1. Field of the Invention

This invention relates to a process and apparatus for the continuous molding of polymer foam and is more particularly concerned with the production of polymer foam bunstock having a substantially rectangular cross-section.

2. Description of the Prior Art

The production of polymer foam, such as polyurethane, polyisocyanurate, and like rigid foams, in the form of continuous bunstock by depositing foam forming mix in a U-shaped mold comprised of a lower conveyor belt and side panels moving in synchronized manner, is well-known in the art. The bunstock so produced is then generally cut to fabricate sheets, boardstock and the like for insulation purposes. In order to avoid substantial waste of useful foam in the cutting of boardstock and the like from the polymer foam bunstock, it is highly desirable that the bunstock be produced with substantially rectangular cross-section.

A process and apparatus for achieving the above result is described in our issued U.S. Pat. No. 4,128,611. The latter discloses the molding of polymer foam bunstock by depositing polymer foam forming mixture in a conventional moving trough-shaped mold and providing, as the sole shaping means applied to the upper surface of the foam, a panel member pivotally mounted at its downstream end which member floats freely on the foam with its underside in tangential contact with the rising foam in an area immediately following the gel point of the foam but preceding the point at which the foam is no longer sufficiently mobile to be molded without distortion of the cells thereof. The panel member is substantially co-extensive in width with the trough-shaped mold in which the foam is rising. The pressure exerted by the panel member on the foam can be varied in a number of ways; for example by adjusting the angle at which the panel member depends from its pivotal mountings, or by adding or subtracting weights on the upper side of the panel member. In accordance with the usual practice a paper web or like separating sheet is placed on the surface of the rising foam so that the panel member does not make direct contact with the foam.

It has been found that the process and apparatus described in the U.S. Pat. No. 4,128,611 perform in a highly satisfactory manner in respect of the commercial production of most forms of polymer foam bunstock. However, certain polymer foams, particularly those which are based on polyisocyanurate-forming compositions, possess a rise profile which cannot be accommodated readily to the needs of the above process and apparatus. The present invention is devoted to a modification of the process and apparatus of U.S. Pat. No. 4,128,611 which modification serves to meet the needs of polymer foams which are characterized by a particular rise profile which will be discussed in more detail below.

The prior art relating to the preparation of polymer foam bunstock is summarized in detail in the aforesaid U.S. Pat. No. 4,128,611 and will not be repeated here. Since the filing date of the latter patent there has been published British Pat. No. 1,476,177 which describes a process for manufacturing polymer foam bunstock in which the rising foam, during a substantial portion of the rise as well as after the rise is essentially complete, is subjected to continuous pressure from a shaping element which can either be in the form of a single rigid element shaped to follow the contour of the foam rise profile or in the form of two planar rigid members one of which is applied to the foam during its rise and the other after rise is complete. This process and apparatus is clearly distinguished from the process and apparatus to be described below.

SUMMARY OF THE INVENTION

This invention comprises an improved process for producing a continuous length of polymer foam bunstock having substantially regular cross-section, uniform density and uniform cell structure comprising the steps of:

advancing at a predetermined, constant rate a continuous conveyor surface along a predetermined path of travel, said conveyor surface comprising a lower supporting portion and separate upstanding portions on laterally opposite sides of said lower portion and defining together a generally trough-like moving mold for the developing foam product;

continuously depositing liquid polymer foam forming mixture on the floor of said moving mold at a location near the entrance thereto;

allowing said foam forming mixture to expand freely over the major portion of its expansion; and causing said expanding foam, at a point approaching the top of the foam rise and beyond that at which the gel point is reached but before said foam is no longer sufficiently mobile to be molded without distortion of the cell structure, to contact the underside of a panel member having a width substantially co-extensive with that of said moving mold and being pivotally mounted, at the downstream end thereof, above said moving mold, said panel member depending from said pivotal mounting and floating freely on said rising foam in tangential contact therewith;

wherein the improvement comprises:

causing said expanding foam, at a point in the foam rise immediately prior to the gel point, to contact the underside of an extension of said panel member, which extension is pivotally mounted on the upstream end of said panel member and has substantially the same width as said panel member; and adjusting the downward pressures exerted by said panel member and said extension thereof so that the said resulting foam bunstock assumes a substantially rectangular cross-section;

said combination of downward pressures being the only restraining forces applied to the surface of said polymer foam during its entire passage through said trough-like moving mold.

The invention also comprises the modified apparatus employed to carry out the above process.

BRIEF DESCRIPTION OF THE DRAWINGS

FIG. 1 is a side elevational view of the foam dispensing and foam rise zones of a conveyor system for the production of polymer foam bunstock in accordance with the prior art procedure.

FIGS. 2 and 3 show portions of the foam rise zone of the system illustrated in FIG. 1 showing the effect of a polymer foam with a two stage rise profile.

FIG. 4 is an enlarged view of a modified portion of the foam rise zone shown in FIG. 3.

FIG. 5 shows a side elevational view of the foam rise zones of FIGS. 2 and 3 modified in accordance with an embodiment of the invention.

FIG. 6 is an enlarged view of an alternative embodiment of the invention.

DETAILED DESCRIPTION OF THE INVENTION

The process and apparatus of the invention will now be discussed with particular reference to the accompanying drawings.

FIG. 1 shows a side elevational view of the foam pour and foam rise zones of a polymer bunstock molding apparatus illustrating a typical embodiment of the process and apparatus disclosed in the aforesaid U.S. Pat. No. 4,128,611, the specification and drawings of which are hereby incorporated by reference. The various components of the polymer foam forming mixture are fed to the mixing head (2) via conduits (4). The foam mix (6) is dispensed from the mixing head (2) on to a continuously advancing paper web (8) which is fed from a roll (not shown). The mixing head (2) is suspended from a bridge (not shown) and is caused to traverse back and forth across the width of the paper web (8) in a direction at right angles to the direction in which said paper web (8) is advanced. The paper web (8) is supported on, and moves synchronously with, an endless conveyor belt (10) which latter in turn is supported by roller bars (12) mounted on an appropriate frame (not shown).

At a point immediately preceding the deposit of foam mix (6) on to paper web (8) the outer edges of the latter are folded upwardly by appropriate folding means (not shown) so as to retain liquid foam mix on said paper after deposit thereon. The bed of the conveyor, formed by the endless belt (10) moving on roller bars (12), is inclined at an angle of about 4°-8° to the horizontal and slopes downwardly away from the point of deposit of foam mix (6). Although not shown in the view illustrated in FIG. 1, side paper webs, supported by endless belts aligned in vertical planes, are supplied to either side of the conveyor shown in said FIGURE, from a location immediately preceding that at which foam mix (6) is deposited. The side papers and continuous belts which support them and which are moved synchronously with the endless belt (12), serve to form, with the bed of the conveyor, a U-shaped trough for molding the foam bunstock. A paper web (9) is dispensed from paper roll (7) and led by roller bar (11) to the top surface of the rising foam.

The foam mix (6) gradually rises and, at a location near the top of the rise, the rising foam makes tangential contact with the undersurface of a panel member (14). The latter is suspended from a bracket (16), located in an overhead beam or gantry (18), by means of a suspension member (20) which can take the form of a flexible or rigid rod, chain, rope and the like. The suspension member (20) is pivotally attached at its lower end to the downstream end of panel member (14) by pivot member (22). The latter can be an appropriate hinge, coupling ring, hook and eye, and the like. While the suspension of the downstream end of the panel member (14) from the overhead beam or gantry (18) can be achieved by using a single suspension member (20) it is preferred to employ two such members mounted in parallel in a vertical plane at right angles to the direction of the advancing foam.

The panel member (14) slopes downwardly away from the pivotal mounting (22) and is provided at its other end (24) with a rope or chain (26) attached thereto by a second pivot member (28). The rope or chain (26) serves to raise or lower the panel member (14), via pulley means (30), to any desired position either before, after, or during operation of the bunstock formation. In normal operation of the device illustrated in FIG. 1 the lower end (24) of the panel member (14) is not supported by the rope or chain (26) but floats freely on the surface of the foam from which it is separated by paper web (9). The contact between the underside of panel member (14) and the surface of the rising foam takes place at a location between the points represented by X and Y. The location X represents the point in the rise of the foam at which the latter has reached the gel point. The location Y represents the point at which the foaming process has advanced to the stage at which the foam no longer has sufficient mobility to be subjected to molding forces, such as those exerted by panel member (14), without deleterious effect on the cell structure and or other desirable physical properties of the foam.

As reported in the aforesaid U.S. Pat. No. 4,128,611, the underside of the panel member (14) must contact the rising foam only within the area between locations X and Y. If contact is made earlier in the foam rise than gel point X, the foam will have insufficient strength to withstand the weight of the panel member (14) and will either collapse or be pushed backwards up the U-shaped mold towards the point of foam deposit. Either result will be disastrous in terms of foam properties. If the contact is made after the point represented by Y in FIG. 1, the panel member (14) will not have any significant effect on the shaping of the foam bunstock. However, if the contact is made between the points represented by X and Y, the force exerted by the panel member (14) will cause the foam to flow laterally to the edges of the U-shaped mold and will render the surface of the foam substantially planar.

In the case of the majority of polymer foam mixtures the distance between the points X and Y and the curvature of the foam rise profile between these points is sufficient to allow a considerable range of latitude within which the point of contact of foam and panel member (14) and the inclination of the latter to the horizontal can both be varied. However, we have recently found that certain foam forming mixtures, particularly those which are predominantly polyisocyanurate foams, have foam rise characteristics which make it very difficult to permit contact between panel member (14) and the rising foam in the region between the points X and Y.

Illustratively, FIGS. 2 and 3 show the problem which arises in seeking to utilize the above process and apparatus in the case of certain polyisocyanurate foam formulations. Polyisocyanurate foams are generally prepared by the trimerization of a polyisocyanate in the presence of a minor amount of a polyol (i.e. an amount which is significantly less than is required to react with all the isocyanate present in the reaction mixture). Two reactions are occurring simultaneously in such a mixture. The faster of the two is the formation of urethane bonds by reaction of the polyol and polyisocyanate and the slower reaction is the formation of isocyanurate bonds. Because these two different reactions are occurring in the reaction mixture used to prepare a polyisocyanurate foam, the foam rise profile of the latter is frequently characterized by two distinct peaks. In general, the first of these peaks corresponds to the major portion of the total rise of the foam. Where this first peak represents less than about 70 percent of the total rise, there is generally no problem in applying the device and method described above to the foam. However, when the first peak represents about 70 percent or more of the total foam rise, it has proved very difficult to apply the aforesaid device and method for reasons which will be apparent from the following discussion.

FIGS. 2 and 3 show such a case in which the first peak, represented by the line R—R' in FIG. 2, is achieved after the major portion (circa 80 percent) of foam rise, represented by the height "a", has taken place and the second peak, which occurs between the points X' and Y' (which have the same significance as X and Y in FIG. 1) is very shallow and represents only a minor portion "b" (circa 20 percent) of the foam rise. In both of FIGS. 2 and 3 the curvature of the second peak is shown in exaggerated form for purposes of clarity. In practice, the second peak has a substantially flat profile as discussed further below.

In the type of foam rise profile represented in FIGS. 2 and 3 there is only a very short distance, and a very shallow foam rise curvature, between the points X' and Y' within which the foam panel member (14) can be applied. Further, the angle of inclination of the panel member (14) is limited unless the point of contact of the latter with the foam surface is very close to the end (24) of said panel member as shown in FIG. 3. Thus, if the point of contact is maintained in substantially the same area as shown in FIG. 1 for a conventional type of foam rise profile, it will be seen from a study of FIG. 2, which shows such a situation, that any significant increase in the angle of inclination of the panel member (14) to the horizontal will result in the end (24) making contact with the foam at a point well before the gel point (X') is reached, with resulting deleterious effects.

Further, when the panel member (14) is positioned as shown in FIG. 3, with the point of contact of the underside of panel member (14) and the foam being very close to the end (24) of the panel member, there is a much greater force exerted by the panel member (14). In addition, there is little or no margin for adjustment of the position of the panel member to accommodate minor fluctuations in the relative positions of the panel member and the gel point X'. Thus, as is illustrated in FIG. 4, if there is a sudden minor change in the position of gel point X', due to example to a change or variation in speed of the conveyor system, which moves this point a small distance towards the point of deposit of foam mix (i.e. the gel point occurs a little earlier) the operator will not have time to adjust the position of panel member (14) from its position shown in FIG. 3. This will result in the situation shown in FIG. 4 in which the end (24) of the panel member (14) has made contact with the rising foam at a point prior to gel and can become immersed in the still fluid foam mix. This situation results in strains established in the foam mix because the rising foam is being subjected to forces which tend to push it back towards the point of foam deposit. These strains are generally manifest in the form of splits in the foam bunstock which is eventually formed.

Indeed, the situation illustrated in FIG. 4 represents that commonly encountered when applying the device and method of the aforesaid U.S. Pat. No. 4,128,611 to the type of polyisocyanurate foam in which the first peak represents about 70 percent or more of the total rise. Thus, as previously stated, the second peak is generally extremely shallow and does not have the very pronounced curvature illustrated in FIGS. 2 and 3. Rather the second rise exhibits no significant curvature and is substantially planar in profile thereby giving rise to the situation which is illustrated approximately in FIG. 4.

Accordingly, for all the above reasons, it has been found that modifications have to be introduced into the process and device described in our aforesaid U.S. Pat. No. 4,128,611 in order to utilize the same in the molding of a polymer foam which has a rise profile such as that shown in FIGS. 2 and 3.

An illustrative embodiment of the present invention, showing such a modification of the process and device of our aforesaid U.S. Pat. No. 4,128,611 is set forth in FIG. 5. In this embodiment the panel member (14) has a relatively short extension (32) hingably attached to its end (24) by appropriate hinge means (34). The extension (32) is advantageously of the same width as the panel member (14), i.e. the width of extension (32) is substantially co-extensive with the width of the U-shaped mold in which the foam bunstock is being formed. The length of the extension (32) is not critical and the most appropriate length for a given foam rise profile can be determined readily by a process of trial and error. In general, it is found that a length within the range of one foot to three feet is appropriate for most situations.

The type of hinge means (34) which is employed to connect the end (24) of the panel member (14) to the abutting edge of the extension (32) is advantageously such as to permit freely raising the outer end of the extension above, or lowering said end below, the plane of the panel member (14). The extension (32) is provided with pivot member (36) and rope or chain (38) which permits the angle of inclination of extension (32) to be adjusted and also permits the latter to be raised out of the way when not required for use, i.e. when the panel member is being used alone to control the contour of a conventional polymer foam whose foam rise profile characteristics do not require the use of the extension (32).

The extension (32) can be prepared from any of the same materials, such as reinforced plastic, fiberboard, plywood and the like, from which the panel member (14) has been prepared. The underside of the extension (32) and the panel member (14) can be coated with appropriate materials such as formica and the like to reduce friction between said underside and the top paper (9).

In the particular embodiment shown in FIG. 5, the position of the panel member (14) and attached extension (32) relative to the foam rise profile is adjusted so that the underside of the extension (32) makes contact with the foam at a point immediately prior to the gel point X' while the underside of the panel member (14) makes contact with the foam at a point within the region between the gel point X' and the point Y', the latter being the point at which the foam is no longer in condition to be molded. The positioning of the panel member and the extension permits the required flexibility in operation, i.e. permits the device to accommodate minor changes which occur in the rise profile during actual continuous operation of the process and also serves to achieve the desired purpose of producing bunstock having substantially regular cross-section without detracting from the overall uniformity and desirable structural strength of the foam.

It will be noted that the height of the roller (11) over which the top paper web (9) is fed to the foam is adjusted so that this roller is at the same height as, or preferably is below the height of, the leading edge of the extension (32) in order that the tensioning effect of this paper is not such as to lift the edge of the extension (32) above the desired level.

The process and apparatus of the invention have been described with particular reference to certain embodiments thereof which have been shown for purposes of illustration only. As will be obvious to one skilled in the art, modifications and variations in the above embodiments can be made without departing from the scope of the invention which is limited only by the claims set forth below. Illustratively, the extension member (32) is shown in FIG. 5 as having a planar configuration. In an alternative embodiment said extension member can have a curved configuration with the convex surface disposed in contact with the foam as illustrated in the cross-sectional view shown in FIG. 6.

We claim:

1. In a process for producing a continuous length of polymer foam bunstock having substantially rectangular cross-section, uniform density and uniform cell structure comprising the steps of:

advancing at a predetermined, constant rate a continuous conveyor surface along a predetermined path of travel, said conveyor surface comprising a lower supporting portion and separate upstanding portions on laterally opposite sides of said lower portion and defining together a generally trough-like moving mold for the developing foam product;

continuously depositing liquid polymer foam forming mixture on the floor of said moving mold at a location near the entrance thereto, said polymer foam forming mixture being one in which two different polymerization reactions are occurring resulting in two distinct rise steps in the foam rise profile the major portion of the total rise prior to gel point taking place in said first step and the minor portion in said second step;

allowing said foam forming mixture to expand freely over the major portion of its expansion; and causing said expanding foam, at a point approaching the top of said second step of the foam rise and beyond that at which the gel point is reached out before said foam is no longer sufficiently mobile to be molded without distortion of the cell structure, to contact the underside of a panel member having a width substantially coextensive with that of said moving mold and being pivotally mounted, at the downstream end thereof, above said moving mold, said panel member depending from said pivotal mounting and floating freely on said rising foam in tangential contact therewith;

the improvement which comprises:

causing said expanding foam, at a point in the foam rise immediately prior to the gel point, to contact the underside of an extension of said panel member, which extension is pivotally mounted on the upstream end of said panel member, has substantially the same width as said panel member, and is of a length such that said extension can float freely in tangential contact with said rising foam without the leading edge thereof being in contact with said rising foam; and adjusting the downward pressures exerted by said panel member and said extension thereof so that in combination they cause said rising foam to assume a substantially rectangular cross-section; said combination of downward pressures being the only restraining forces applied to the surface of said polymer foam during its entire passage through said trough-like moving mold.

2. The process of claim 1 in which the polymer foam forming mixture is a polyisocyanurate foam forming mixture.

3. The process of claim 1 in which the said extension of said panel member is substantially planar in configuration.

4. The process of claim 1 in which said extension of said panel member has a cross-sectional configuration, taken in the direction in which the mold is moving, which is convex downwardly.

5. In an apparatus for the production of a continuous length of polymer foam bunstock having substantially rectangular cross-section utilizing a polymer foam forming mixture in which two different polymerization reactions are occurring resulting in two distinct rise steps in the foam rise profile the major portion of the total rise prior to the gel point taking place in said first step and the minor portion in said second step, which apparatus comprises in combination:

conveyor means comprising a continously advancing lower supporting portion and separate, vertically disposed, continuously advancing side portions associated with said lower portion so as to define an open-topped mold of generally U-shaped cross-section;

means driving said lower and side portions synchronously along a predetermined path of travel;

means for dispensing foam forming mix on the lower portion of said conveyor at the entrance of said mold;

a panel member of a width substantially coextensive with that of said open-topped mold having its downstream end adjustably and pivotally mounted above said open top conveyor, said panel member depending downwardly from said pivotal mounting and adapted to make tangential contact on its underside with the surface of foam rising in said open-topped mold at a point approaching the top of said second step of the rise and beyond that at which the gel point is reached but before said foam is no longer sufficiently mobile to be molded without distortion of cell structure; and means located at the end of said conveyor for cutting foam bunstock into lengths of predetermined size and for removing said lengths from said conveyor;

the improvement which comprises:

extension means pivotally mounted on the upstream end of said panel member, being of a width substantially coextensive with, and a length substantially less than, said panel member;

said extension means being adapted to make tangential contact on its underside with the surface of foam rising in said open-topped mold at a point immediately prior to the gel point of said foam.

* * * * *

UNITED STATES PATENT OFFICE
CERTIFICATE OF CORRECTION

Patent No. 4,267,135     Dated May 12, 1981

Inventor(s) Richard M. Stroud and Richard A. Kolakowski

It is certified that error appears in the above-identified patent and that said Letters Patent are hereby corrected as shown below:

Column 5, line 50 "due to example" should read --due for example--.
Column 7, claim 1, line 48 "out" should read --but--.

Signed and Sealed this

Twenty-fifth Day of August 1981

[SEAL]

Attest:

Attesting Officer

GERALD J. MOSSINGHOFF

Commissioner of Patents and Trademarks